(12) United States Patent
Basu et al.

(10) Patent No.: US 10,628,386 B2
(45) Date of Patent: Apr. 21, 2020

(54) METHODS AND SYSTEMS TO CUSTOMIZE PRINTABLE INFORMATION

(71) Applicant: XEROX CORPORATION, Norwalk, CT (US)

(72) Inventors: Chiranjib Basu, Kolkata (IN); Rahul Raj, Jamtara (IN)

(73) Assignee: XEROX CORPORATION, Norwalk, CT (US)

( * ) Notice: Subject to any disclaimer, the term of this patent is extended or adjusted under 35 U.S.C. 154(b) by 132 days.

(21) Appl. No.: 15/599,857

(22) Filed: May 19, 2017

(65) Prior Publication Data

US 2018/0336195 A1    Nov. 22, 2018

(51) Int. Cl.
*G06F 15/00* (2006.01)
*G06F 16/178* (2019.01)
*G06F 3/12* (2006.01)
*G06F 8/41* (2018.01)

(52) U.S. Cl.
CPC ........ *G06F 16/1794* (2019.01); *G06F 3/1205* (2013.01); *G06F 3/1206* (2013.01); *G06F 3/1243* (2013.01); *G06F 3/1248* (2013.01); *G06F 3/1285* (2013.01); *G06F 8/427* (2013.01)

(58) Field of Classification Search
CPC ............. G06F 17/30005; G06F 3/1204; G06F 3/1205; G06F 3/1284; G06F 3/1288; G06F 16/1794
USPC ....................................................... 358/401
See application file for complete search history.

(56) References Cited

U.S. PATENT DOCUMENTS

| | | | |
|---|---|---|---|
| 2011/0170140 A1* | 7/2011 | Naka ...................... | G06F 3/1205 358/1.16 |
| 2013/0002674 A1* | 1/2013 | Lea .......................... | G09G 5/00 345/428 |
| 2013/0155436 A1* | 6/2013 | Gaertner ................ | G06F 3/1208 358/1.13 |

* cited by examiner

*Primary Examiner* — Mark R Milia
(74) *Attorney, Agent, or Firm* — Jones Robb, PLLC

(57) ABSTRACT

Examples of a printing system are described herein. In an example, the printing system that uses the original print job created for the PDF/VT file for building a modified print job that includes a set of instructions to render the PDF/VT file which is modified on the run, or on the fly. The original print job includes instructions for using a fixed metadata. In one example, the fixed metadata is a Document Part (DPart) Metadata (DPM), and can be expressed in a hierarchical structure expressed in a tree structure called Document Part (DPart). The metadata is extracted from the PDF/VT file, and then used to build the modified print job including alternate instructions based on print conditions corresponding to the metadata.

20 Claims, 12 Drawing Sheets

METHODS AND SYSTEMS TO CUSTOMIZE PRINTABLE INFORMATION

TECHNICAL FIELD

The present subject matter relates generally to variable and transactional printing systems and, more particularly, to creation of a print job that includes instructions for customizing production information available in a print job for variable and transactional printing.

BACKGROUND

Portable Document Format (PDF) is a commonly used standard for representing finished documents after formatting. Generally, a PDF describes text and graphics of a page at a high level in terms that a raster image processor (RIP) can interpret. The RIP reads the information and accesses the necessary files from the PDF for converting the PDF to a raster image for outputting an output image electronically on a display, or as a printout by an image rendering device, such as printing system.

A relatively newer standard is a Portable Document Format for Variable and Transactional (PDF/VT) printing. The PDF/VT defines the usage of PDF file as an exchange format for variable and transactional printing. Generally, fixed content portions of the PDF file function as a template, which is adapted for use in multiple renderings. Each rendering undergoes a merging of the fixed content with variable content for providing printout or display output with the variable content. The PDF/VT file can include production information in print job, known as an electronic job ticket, which is provided to a print engine for rendering a finished document.

Currently, the print job is created with the PDF/VT file for setting forth particular instructions for processing the print job of that PDF/VT file. However, once the print job is submitted by a user, the user has no control on customizing or amending of the production information present in the PDF/VT file. For example, in a banking industry, in case a user may have submitted the print job and then later he/she realizes that some extra information is required to be added in the PDF/VT file of the print job, the user has to then again generate a new print job with added extra information.

Accordingly, there is a need for a method and a system that does not require a new print job be created or modified for each instance a PDF/VT file is used to create production information and render the production information as a printout.

SUMMARY

According to aspects illustrated herein, a method for enabling use of metadata to control printing outcomes is disclosed. The method includes receiving, at a printing system, an original print job comprising Portable Document Format for Variable data and Transaction (PDF/VT) file. In an example, the PDF/VT file comprising metadata for production information available in the PDF/VT file. Following the receipt of the original print job, a graphic user interface of the printing system receives a request from a user to extract the metadata of the original print job from the PDF/VT file. Upon receiving the request, a number of print conditions are displayed on the graphic user interface for the metadata. In an example, the print conditions are options for modifying the production information available in the PDF/VT file of the original print job. After the displaying and in response to receiving directional inputs from the user, the metadata for production information available in the PDF/VT file is extracted. The metadata includes key-value pairs of the production information available within the PDF/VT file. Based on the extracted key-value pairs, an external database is queried for modifying the production information to generate a modified PDF/VT file. Based on the modified PDF/VT file, a processor generates a modified print job. Based on the modified PDF/VT file, the modified print job is decomposed for producing a digital bitmap image. Then, the digital bitmap image is utilized to render an output image. The output image is then printed at the printing system.

According to aspects illustrated herein, a printing system for enabling the use of metadata to control printing outcomes is disclosed. The printing system includes a graphic user interface to receive a request from a user to extract the metadata of an original print job from the PDF/VT file, and to display a number of print conditions for the metadata upon receiving a request from the user. In an example, the print conditions are options for modifying production information available in the PDF/VT file of the original print job. The printing system further comprises a processor coupled to the graphic user interface. The processor includes a parser to extract the metadata for the production information available in the PDF/VT file after the displaying and in response to receiving directional inputs from the user. In an example, the metadata includes key-value pairs of the production information available within the PDF/VT file. The parser also queries an external database based on the extracted key-value pairs for modifying the production information to generate a modified PDF/VT file, and generate a modified print job based on the modified PDF/VT file. Based on the modified PDF/VT file, a decomposer coupled to the processor decomposes the modified print job for producing a digital bitmap image. The digital bitmap image is then forwarded to a print engine, coupled to the decomposer and the processor. The print engine renders an output image using the digital bitmap image, and prints the output image at the printing system.

According to aspects illustrated herein, a non-transitory computer-readable medium implementing the subject matter includes instructions executable by a processing resource. The instructions are executed to receive a request from a user to extract the metadata of an original print job from a PDF/VT file. Upon receiving the request, a number of print conditions are displayed for the metadata. In an example, the print conditions are options for modifying the production information available in the PDF/VT file of the original print job. After the displaying and in response to receiving directional inputs from the user, the metadata for production information available in the PDF/VT file is extracted. The metadata includes key-value pairs of the production information available within the PDF/VT file. Based on the extracted key-value pairs, an external database is queried for modifying the production information to generate a modified PDF/VT file. Based on the modified PDF/VT file, a modified print job is generated. Further, based on the modified PDF/VT file, the modified print job is decomposed for producing a digital bitmap image. Then, the digital bitmap image is utilized to render an output image. The output image is then printed at the printing system.

Other and further aspects and features of the present subject matter will be evident from the following detailed description of the exemplary implementations, which are intended to illustrate, not limit, the present subject matter.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 4A to 4D illustrate an operation of the printing system, according to an implementation;

DETAILED DESCRIPTION

Figure 1:
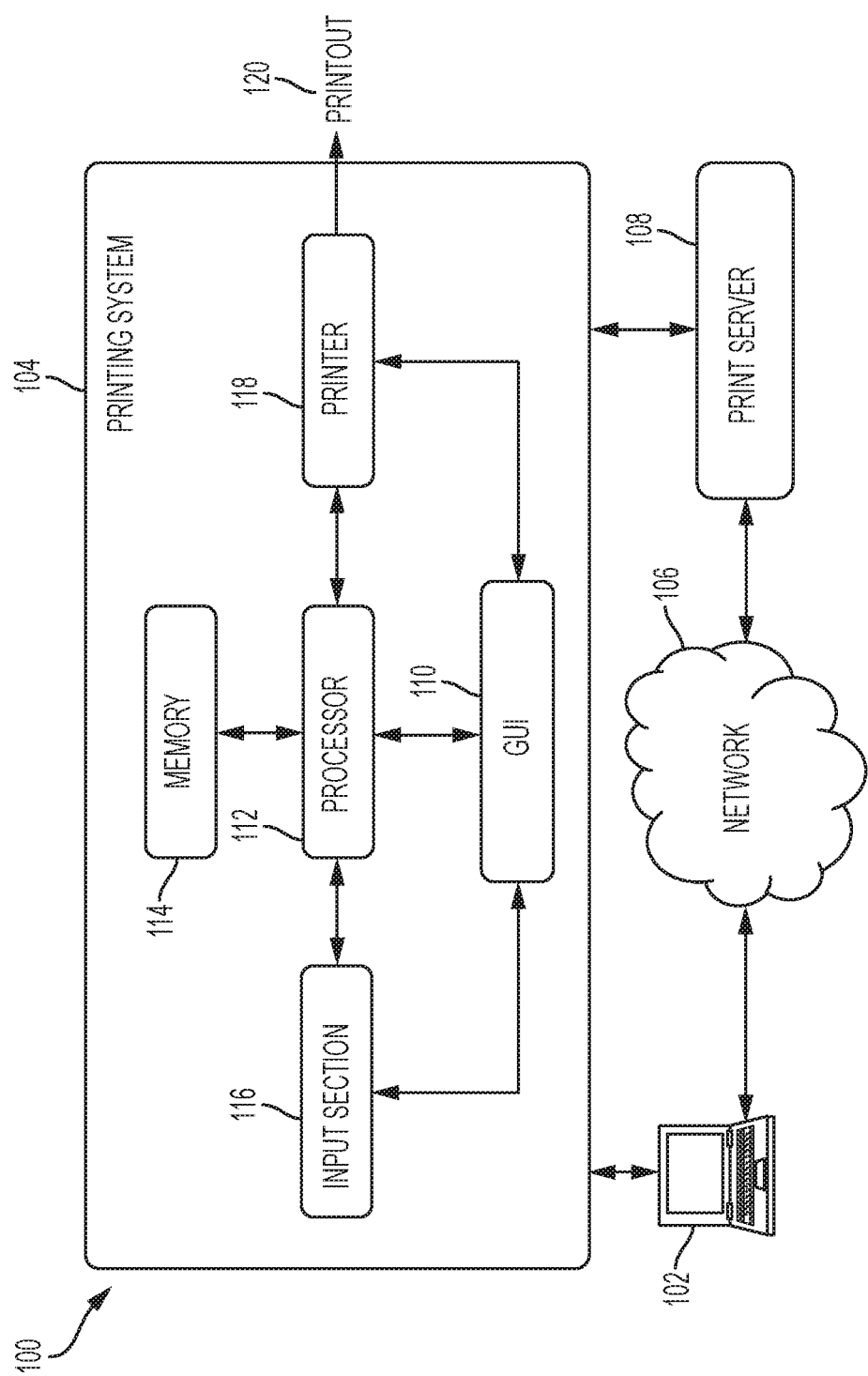
FIG. 1 illustrates a block diagram of a printing environment, according to an implementation.

A few aspects of the present subject matter are explained in detail below with reference to the various figures. Example implementations are described to illustrate the disclosed subject matter, not to limit its scope, which is defined by the claims. Those of ordinary skilled in the art will recognize a number of equivalent variations of the various features provided in the description that follows.

Non-Limiting Definitions

In the disclosure herein after, one or more terms are used to describe various aspects of the present subject matter. For better understanding of the subject matter, a few definitions are provided herein for better understating of the present disclosure.

"Metadata" is a set of data that provides information about other. Generally, there are three types of metadata, namely descriptive metadata, administrative metadata, and structural metadata. In the present disclosure, metadata represents the structural metadata. The structural metadata is metadata about containers of metadata and indicates how compound objects are put together, for example, how pages are ordered to form chapters. Further, with reference to the present disclosure, the metadata generally includes a set of data including, say, a list of name of bank customers, and such set of data provides information or linkage to other data, such as age, address, gender, pin code, using key-value pair scheme.

"Key-value pair" (KVP), also known as "attribute-value pair," is a standard or fundamental feature of computer systems and applications for retrieval of associated data from an internal or external memory. Generally, KVP is a set of two linked data items; a key which is a unique identifier for some item of data, and a value which is either the data that is identified or a pointer to the location of that data. The key-value pairs are frequently used in lookup tables, hash tables, and configuration files. In the present disclosure, the key-value pairs are used to modify metadata for production information available in a Portable Document Format for Variable and Transactional (PDF/VT) file.

"Production information" is an information embedded in a print job request, and corresponds to data present in an input document that is to be rendered or produced during various stages of a print rendering process.

"Print job" is generally a print job ticket that includes instructions for using PDF/VT metadata of the production information present in a PDF/VT file. The print job is created by a user to submit a print request of the production information. For creation of the print job, the production information is structured to generate a PDF/VT file. Then, the PDF/VT file is embedded in the print job and follows instructions of the print job during the various stages of a print rendering process.

"Print server" may be defined as including, but not necessarily limited to, a computing device, program, or combination thereof that processes requests, delivers data or other information, or provides one or more services over the cloud and/or a local network.

"Client device or user device" is defined as including, but not necessarily limited to, hardware, software, or a combination thereof that accesses a server. Examples include, but are not limited to, a computing device, phone, tablet, personal digital assistant, or server.

"Printing system" may be defined as including, but not necessarily limited to, a peripheral that produces a representation of a document on one or both sides of media such as paper, transparency, fabric, etc. A printer can be single function device or multi-function device (e.g., including scanning, faxing, or other functionality). The multi-function device may include software, hardware, firmware, or combination thereof. Further, the printer can use any of a variety of different types of marking technologies such as laser, inkjet, dye-sublimation, off-set printing, thermal printing, impact, etc. As used herein, the terms "render" and "rendering" are defined as including, but not necessarily limited to, taking print data such as text, images, graphics, etc. and converting them into a ready to print (RTP) format that is compatible with a destination printer.

"Computer-readable medium" or "storage medium" may be a physical medium that can store data. Examples of "computer-readable medium" may include magnetic medium such as diskettes, floppy disks, and tape; optical medium such as laser disks and CD-ROMs; and semiconductor medium such as semiconductor ROMs and RAMs. As used herein, "storage medium" covers one or more distinct units of a medium that together store a body of data. For example, a set of floppy disks storing a single body of data would together be storage medium.

Overview

The present disclosure is directed to a method and a system that enables the usage of metadata of production information available in a page description language (PDL) file, such as PDF/VT file, to control print outcomes.

The subject matter disclosed in the present disclosure relates to usage of metadata of the PDF/VT file to control printing outcomes. More particularly, the present subject matter describes creation of a new print job or modification of an original print job, on the fly, when a PDF/VT file is to be customized or modified. The subject matter is directed to a method and a system that uses the original print job created for the PDF/VT file for building a modified print job that includes a set of instructions to render the PDF/VT file which is modified on the run, or on the fly. The original print job includes instructions for using a fixed metadata. In one example, the fixed metadata is a Document Part (DPart) Metadata (DPM), and can be expressed in a hierarchical structure expressed in a tree structure called Document Part (DPart). The metadata is extracted from the PDF/VT file, and then used to build the modified print job including alternate instructions based on print conditions corresponding to the metadata.

Thus, with the implementation of the present subject matter, the print job can receive additional information in the PDF/VT file on the run, and that too without adding or creating a new PDF/VT file. Such implementation reduces the additional effort of recreating the entire print job. Hence, the present subject matter facilitates the users to extract the production information from the PDF/VT file, to use that production data as a base to consume additional information from external resources, such as external databases, and to print the modified production data of the PDF/VT file as output having additional information.

Exemplary Implementations

The following disclosure explains a mechanism where a printing system, such as FreeFlow print server (FFPS), with some hardware and software enhancements, is enabled to facilitate a user of a user device (or client device) to modify production information or embed addition information into the production information. Such printing system is further described with reference to FIGS. 1-6.

It should be noted that the description and the figures merely illustrate the principles of the present subject matter along with examples described herein, and should not be construed as a limitation to the present subject matter. It is, thus, understood that various arrangements may be devised that, although not explicitly described or shown herein, embody the principles of the present subject matter. Moreover, all the statements herein reciting principles, aspects, and implementations of the present subject matter, as well as specific examples thereof, are intended to encompass equivalents thereof.

FIG. 1 illustrates, as an example, a printing environment 100 for printing of electronic documents, according to an example of the present subject matter. The printing environment 100 includes a plurality of user devices, out of which one user device 102 is shown for the sake of brevity. Examples of the user device 102 may include, but are not limited to, workstation, personal computer, personal digital assistant (PDA), laptop computer, notebook, smart phone, smart camera, smart television sets, and other smart devices.

Further, the printing environment 100 includes a printing system 104. The printing system 104 can include single function capabilities or multi-function (e.g., including scanning, faxing, or other functionality) capabilities. The printing system 104 may include software, hardware, firmware, or combination thereof.

In an example, the printing system 104 and the user device 102 are connected directly over a network 106 or through a print server 108 over the network 106. In an example, the print server 108 may be a network server, a web server, or a data server. The network 106 may be a single network or a combination of multiple networks. The network 106 may include one or more area networks, such as a local area network (LAN), a wide area network (WAN), an intranet, the internet, or any other type of network. In an example, the network 106 may include mobile communication network, for example, 2G, 3G or 4G mobile communication network.

In an example, a user of the user device 102 logins to a printing service. The printing service can be offered directly by the printing system 104 or by the print server 108 coupled to the printing system 104. The user can login from the user device 102 present anywhere in the network 106, for submission of a print job to the printing service. Further, for submission of the print job, the user device 102 can facilitate the user to access a (web) portal of the printing service. In an example, the user may access the portal by selecting a print command. In another example, the user may access the portal by directly entering a URL address of the portal in a (web) browser. In yet another example, the user may access the portal using other (web) elements, such as widgets, and web enabled applications. Further, the portal may present a user interface, such as a print dialogue box, or a graphical user interface (GUI).

For the printing service, the print job from the user device 102 is received either by the printing system 104 through the print server 108 or directly from the user device 102, based on the user's selection. The print job is received in the form of a page description language (PDL) file such as Portable Document Format for Variable and Transactional printing (PDF/VT) file. The PDF/VT file may include production information about various objects, say, characters, words, text, graphics, photos, and the like, contained in the PDF/VT file. Further, the PDF/VT file includes instructions for using a fixed metadata present in the PDF/VT file. In one example, the fixed metadata is a Document Part (DPart) Metadata (DPM), and can be expressed in a hierarchical structure expressed in a tree structure called Document Part (DPart) for the production information. In one example, the DPM may also be referred to as PDF/VT metadata in the description hereinafter. Further, the production information is information that is to be rendered and printed by the printing system 104.

As per an implementation of the present subject matter, once the print job is received at the printing system 104 and the user forgets to edit the production information or add some additional information, the user may request the PDF/VT metadata of the print job of the PDF/VT file using a graphic user interface (referred hereinafter as "GUI") 110 of the printing system 104. The GUI 110 is used by the user for enabling the use of PDF/VT metadata to drive print outcomes. The GUI 110 also provides the user with the capability of creating print condition-specific print jobs. The GUI 110 may be accessed by the user in the printing environment 100 either directly remotely or through an individual device, such as a print server 108 or a remote computer (not shown). The remote computer as well as the user device 102 may access the GUI 110 of the printing system 104 to enter selections for associated print conditions with the PDF/VT metadata extracted from the PDF/VT file associated with the original print job.

For purposes of modifying and/or building the new print job, any remote or local computing device, say the user device 102 or the print server 108, capable of communicating with the printing system 104 can be used. All that is necessary to define or modify the print job remotely is a computing device that is adapted to provide the updated production information. For example, the print server 108 or the user device 102 may include a print job creation component to provide alternate means for accessing the original print job for the PDF/VT file through the GUI 110 of the printing system 104.

In an example, if the user has access to the printing system 104 through the print server 108, the print server 108 can provide the user or the user device 102 with interfaces to facilitate print operation. In addition, the user device 102 can provide its own interface for generating the print job for use with connected devices, such as the printing system 104.

Continuing with the description of FIG. 1, the printing system 104 includes a digital processor 112 having a main memory (i.e., a job storage) 114, but is contemplated in some implementations as further having an additional memory (not shown). The memory 114 stores PDF/VT print job files written in a printer page description language (PDL), wherein the user can select one for production information or printouts of selected image components obtained from the PDL. The processor 112 further includes an input section 116 for providing the print jobs in the PDL format.

Furthermore, as per the implementation of the present subject matter, the GUI 110 enables the user to interact with the processor 112, the input section 116, and a printer 118 which can be a multi-function image producing device. Yet further, the GUI 110 collectively represents the input devices through which the printing system 104 receives image editing and manipulation instructions entered or input by the user for the processor 112. Additionally, the GUI 110 represents output devices through which the user receives feedback with respect to the actions that are taken in response to the instructions that are entered by the user or otherwise, such as under program control. For example, the GUI 110 generally includes a keyboard or the like for entering user instructions, a display monitor for displaying the process that is being performed by the processor 112, and a cursor controller for enabling the user to make selections from and/or enter data into a process that is being displayed by the monitor.

Figure 2:
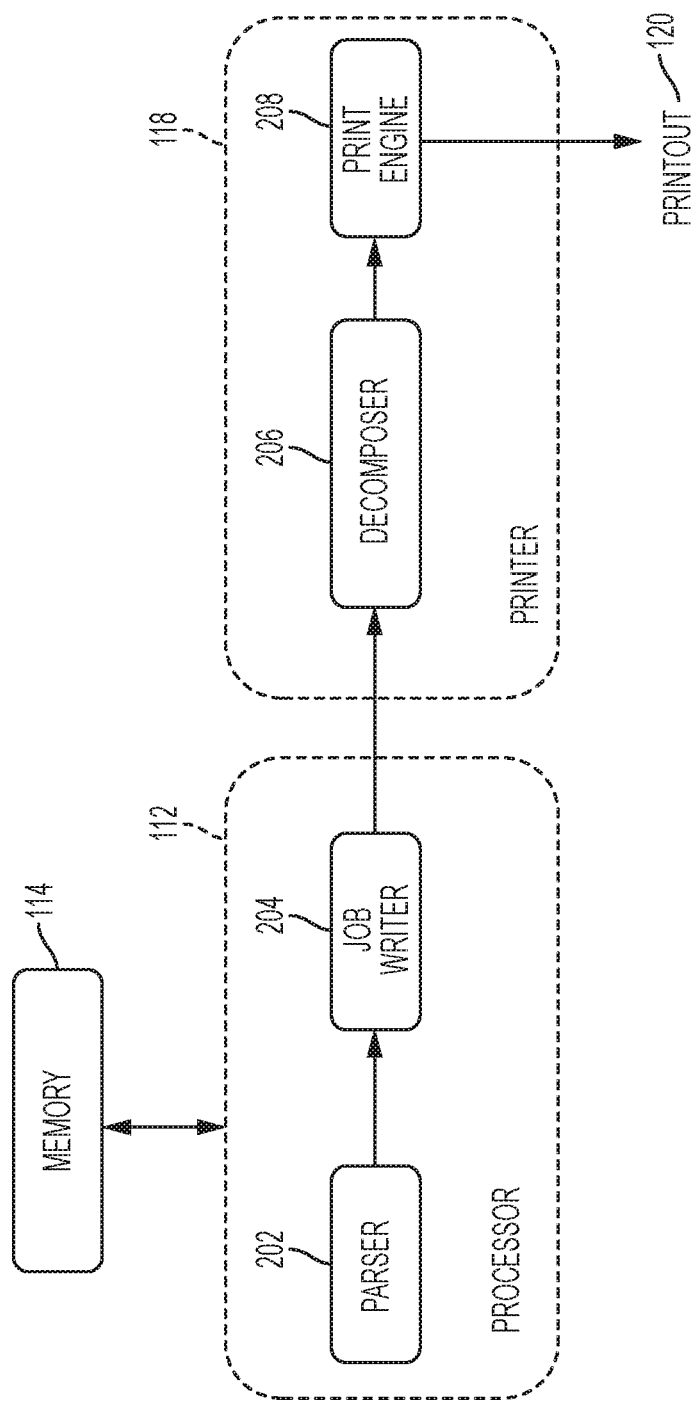
FIG. 2 illustrates a detailed block diagram of a printing system, according to an implementation.

Returning to the present subject matter and referring to FIG. 2, once the print job is received at the printing system 104 and the user forgets to edit the production information or add some additional information, the user may request for the PDF/VT file for the print job using the GUI 110 of the printing system 104. At the GUI 110, the user submits a request to extract the PDF/VT file of the print job from the PDF/VT files stored in the memory 114. Upon receiving the request for the PDF/VT file, the GUI 110 provides to the user on a digital front end (DFE) an interface for a PDF/VT definer application for modifying or editing the content of the PDF/VT file. The interface for the PDF/VT definer application displays a list of PDF/VT files received by the printing system 104 for printing purposes. In one example implementation, the user may then select one of the PDF/VT file displayed on the GUI 110. Based on the selection made by the user, the selected PDF/VT file is obtained from a list of PDF/VT files stored in the memory 114. Generally, a file that has been previously converted to a PDF format is obtained.

The selected PDF/VT file is included in a previously generated print job (hereinafter referred to as an "original print job"). The original print job describes the specifications and/or attributes of the print job, such as, for example, paper size, print quantity, manual/duplex printing, print stock, and finishing items (i.e., hole-punch, binding, and stapling, etc.). The original print job may also define a set of electronic instructions that enables the automatic printing of the PDF/VT file. The PDF/VT file includes the variable content information that was merged with the fixed content of the PDF document to form the PDF/VT file. The variable content is hereinafter referred to as "values" and the fixed content is hereinafter referred to as "keys."

Figure 3A:
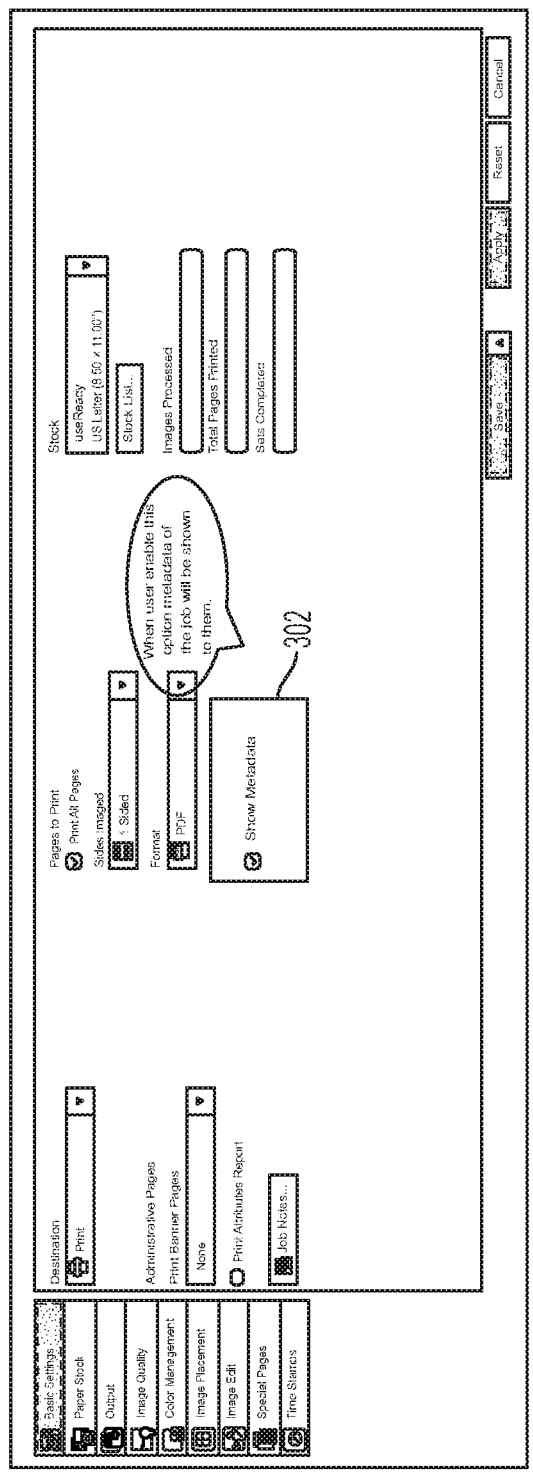
FIGS. 3A to 3D illustrate an operation of the printing system, according to an implementation.

Once the selected PDF/VT file is obtained, the user submits a request to extract the metadata of the print job from the PDF/VT file. In an implementation, the user may submit the request by clicking an option "show metadata" 302 (FIG. 3A).

Upon receiving the request from the user at the GUI 110, the printing system 104 displays a number of print conditions on the GUI 110. In an example, the GUI 110 can provide or display the print conditions to user in the form of drag-and-drop options, pull-down options, spread-sheet options, and any conventional known options.

Figure 3B:
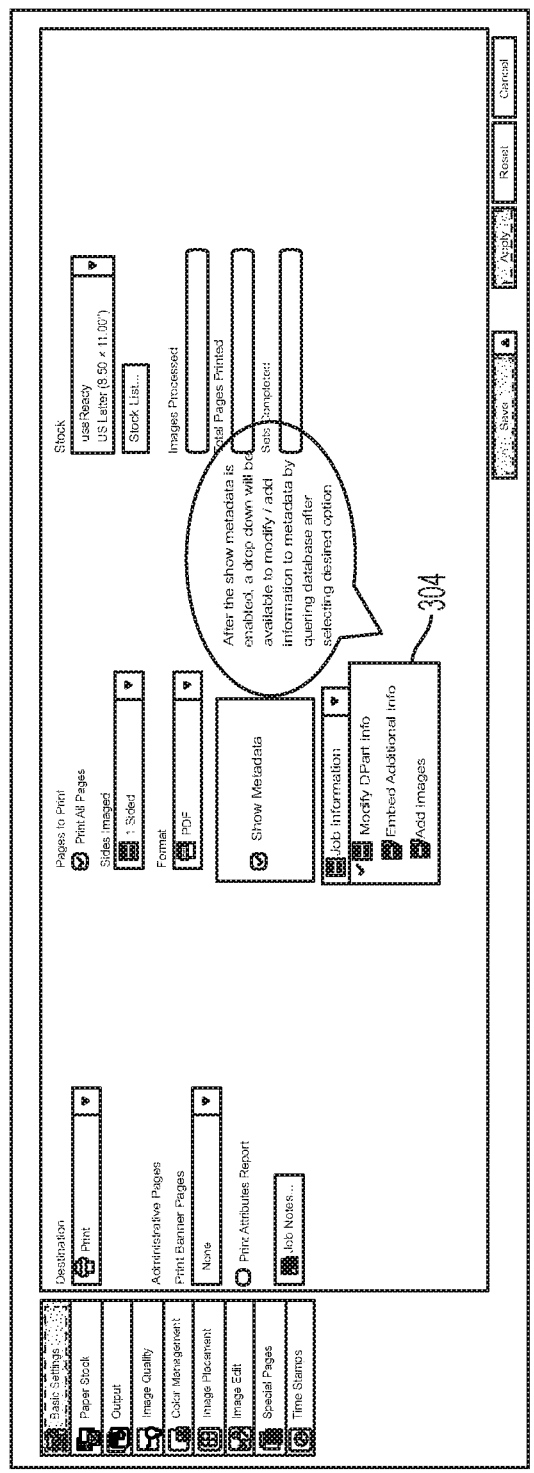

FIG. 3B shows print conditions 304 to user in the form of drag-and-drop options, as per an implementation of the present subject matter. As can be seen from FIG. 3B, the GUI 110 generally shows the print conditions including one of (i) modify DPart information, (ii) embed additional information, and (iii) add images. However, in case a user wants to generate more print conditions, the GUI 110 allows the user to create new print conditions apart from the displayed or existing conditions, without departing from the scope of the present subject matter.

Figure 3C:
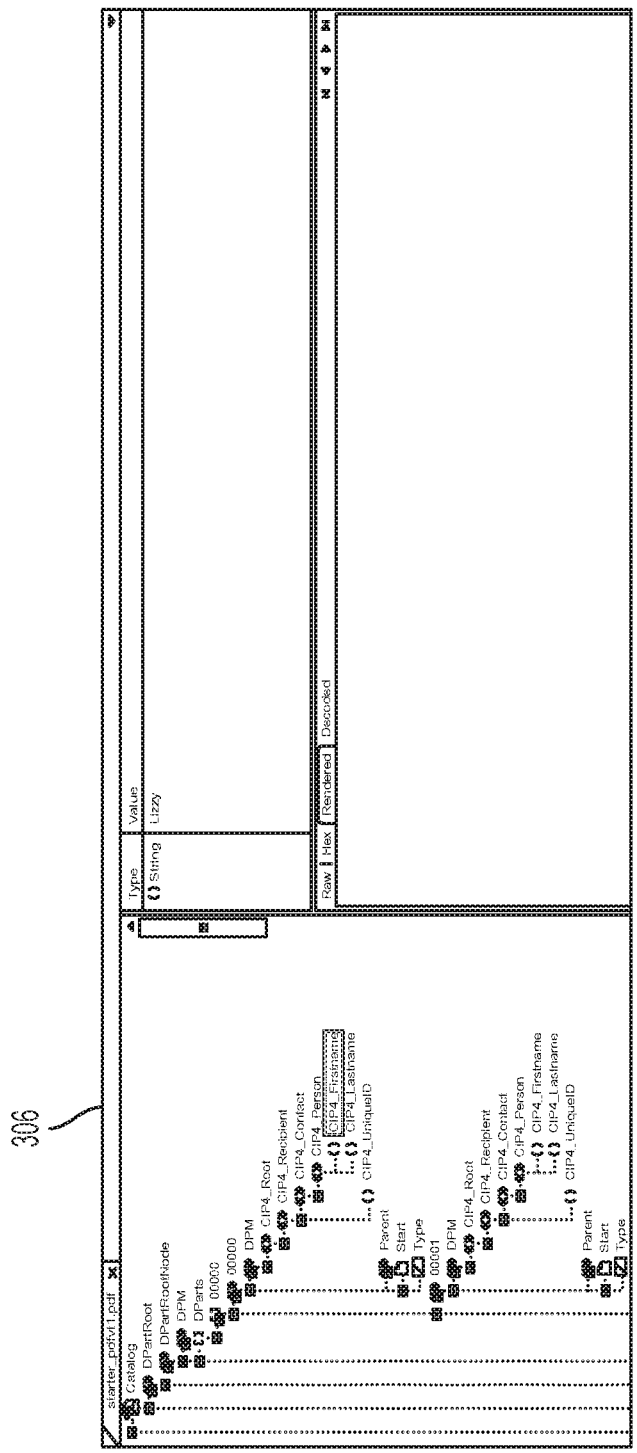
Figure 3D:
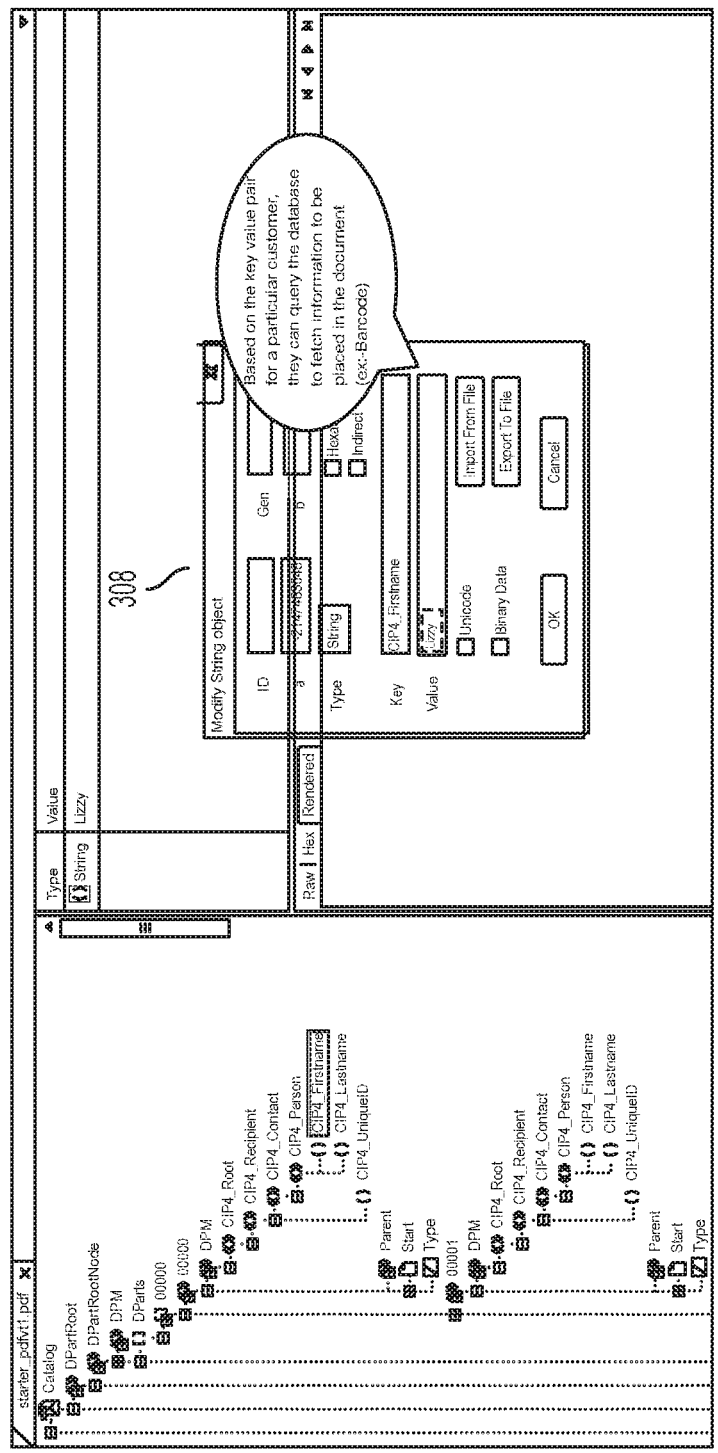

Returning to the present subject matter, once the print conditions are displayed to the user by the GUI 110, the user may then select any one of the print conditions. For instance, considering that the user has selected the first print condition of "modify DPart information," the GUI 110 may trigger a parser 202 of the processor 112 to extract the metadata of DPart information included in the PDF/VT file. Then, the metadata is extracted and displayed on a popup window 306 in the GUI 110 (FIG. 3C). FIG. 3C shows the DPart information of the PDF/VT print job. Following the extraction of the metadata, the parser 202 parses the PDF/VT file to extract the keys/attributes of the DPart information. More specifically, the parser 202 parses and records the metadata key-value pairs within the selected PDF/VT file. In an example, a metadata pair can include a variable content value of "female" or "male" for a gender attribute/key included in the metadata. Further, at least attribute information that relates to the variable content is extracted from the metadata. In one implementation, the GUI 110 can display a metadata key-value pairs 308 (FIG. 3D). In one alternative implementation, the GUI 110 can limit the number of metadata key-value pairs presented to the user to only select metadata key-value pairs desired by the user. For example, the GUI 110 can display user-selected metadata key-value pairs to the user on the GUI 110, while suppressing undesirable metadata key-value pairs from view.

Once the metadata key-value pairs are extracted or shown, the GUI 110 of the printing system 104 provides condition of satisfaction and action item to the user for imposing conditional limitations on metadata attributes/keys based on the extracted values. In other words, the GUI 110 can provide the user with drag-and-drop options, pull-down options, spread-sheet options, and any conventional, known option for building conditional logic for print-actions based on the extracted key-value pairs. Generally, the metadata of DPart is fixed, but the capabilities of print engines, i.e., IOT state, can change. Accordingly, the user can create condition of satisfaction.

Figure 4A:
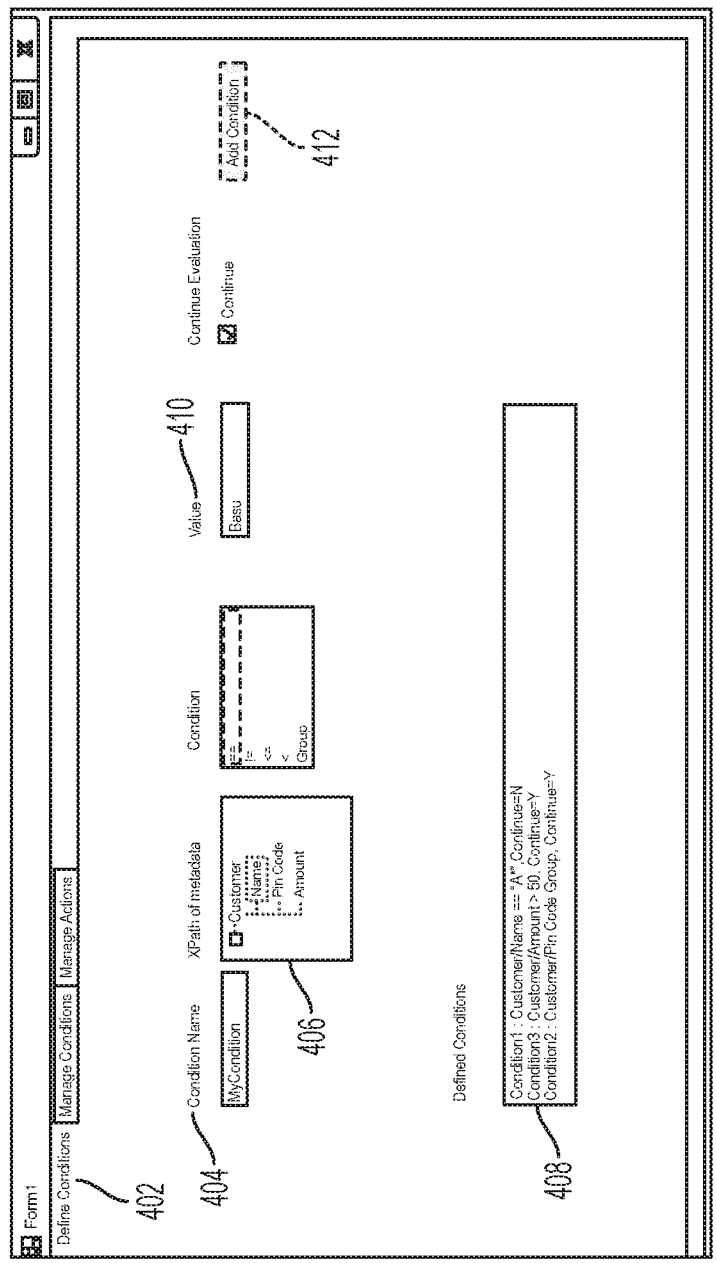

For example, with reference to FIG. 4A, the GUI 110 allows the user to create or define condition of satisfaction 402. For example, the GUI 110 allows the user to perform any of the following:

1) allowing the user to provide a "Name" 404 to the condition of satisfaction 402;
2) allowing the user to select a path 406 from a pre-populated tree from DPart information in the print job;
3) allowing the user to select the condition of satisfaction from the already existing set of predefined conditions of satisfaction 408;
4) allowing the user to specify a value 410, such as numeric, string, regex expression, etc.; and
5) allowing the user to add a new condition of satisfaction 412 by clicking on one of the available choices on the GUI 110.

Figure 4B:
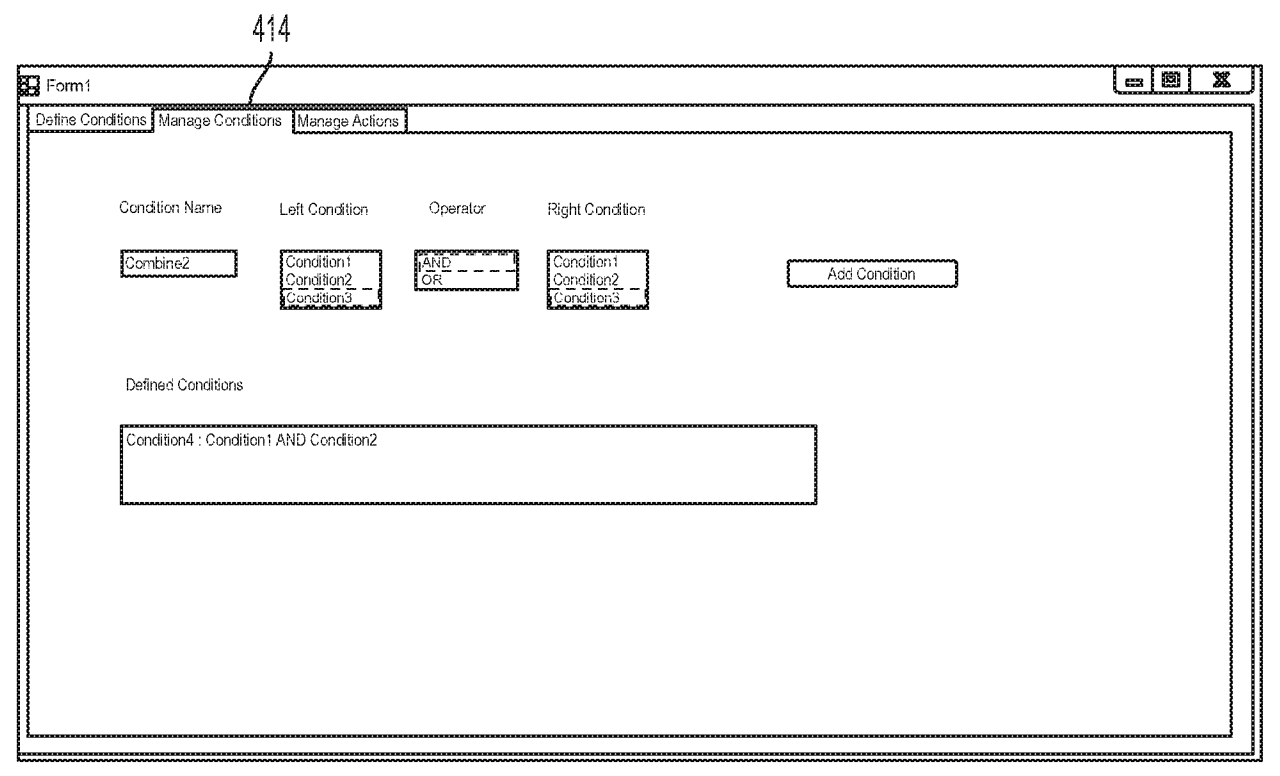

Further, with reference to FIG. 4B, the GUI 110 also allows the user to manage conditions 414 by allowing the user to create further complex conditions by chaining them together using And/OR/Not operators.

Figure 4C:
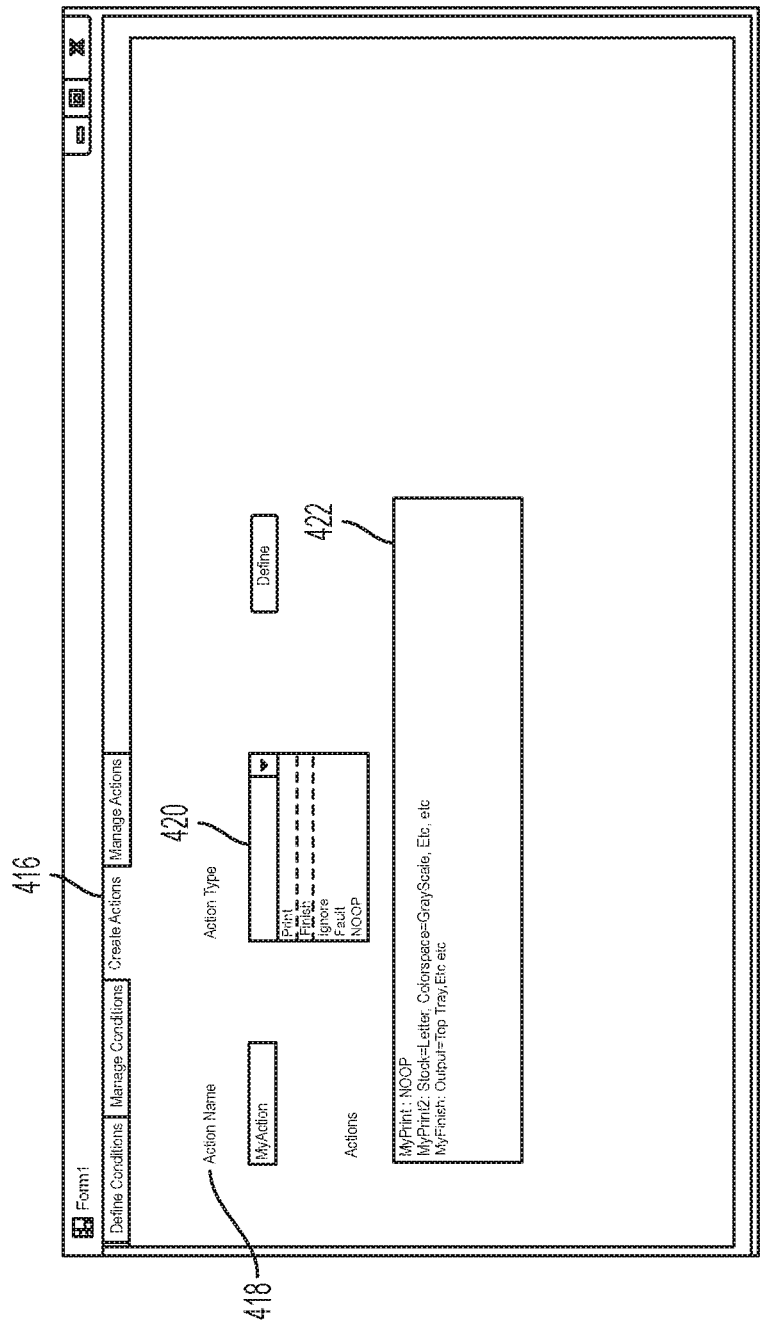

Yet further, with reference to FIG. 4C, the GUI 110 also allows the user to define actions 416 for a condition of satisfaction. For example, the GUI 110 allows the user to perform any of the following:

1) allows the user to specifying an "action name" 418 for an action associated with the condition of satisfaction;
2) allowing the user to select an action from the existing pre-populated actions 420 including, but not limited to, printing, finishing, no action, finish action, no operation, indicating fault, or default action, wherein the user can select the action using a drop-down feature;
3) allowing the user to define a new action 422 through the following exemplary step:
   a) the user has to click on a soft button "define a new action." After clicking on the soft button, a separate window (not shown) may be opened by the GUI 110. Thereafter, the user may be facilitated by a drop-down menu to select the type of action which the user wants to define. A few exemplary scenario are listed below for the ease of understanding:
      i. in case the user selects to define an action type of "printing," the GUI 110 may allow the user to specify print features, including stock, color mode, imposition template, and the like, which are associated with the "printing" action type,
      ii. in case the user selects to define an action type "finishing," the GUI 110 allows the user to change destination, shift, trc, and the like features associated with finishing of a document,
      iii. in case the user selects an action type "ignore," "fault," and the like, then the GUI 110 may itself sets the actions or parameter without requiring any specific inputs from the user.

Figure 4D:
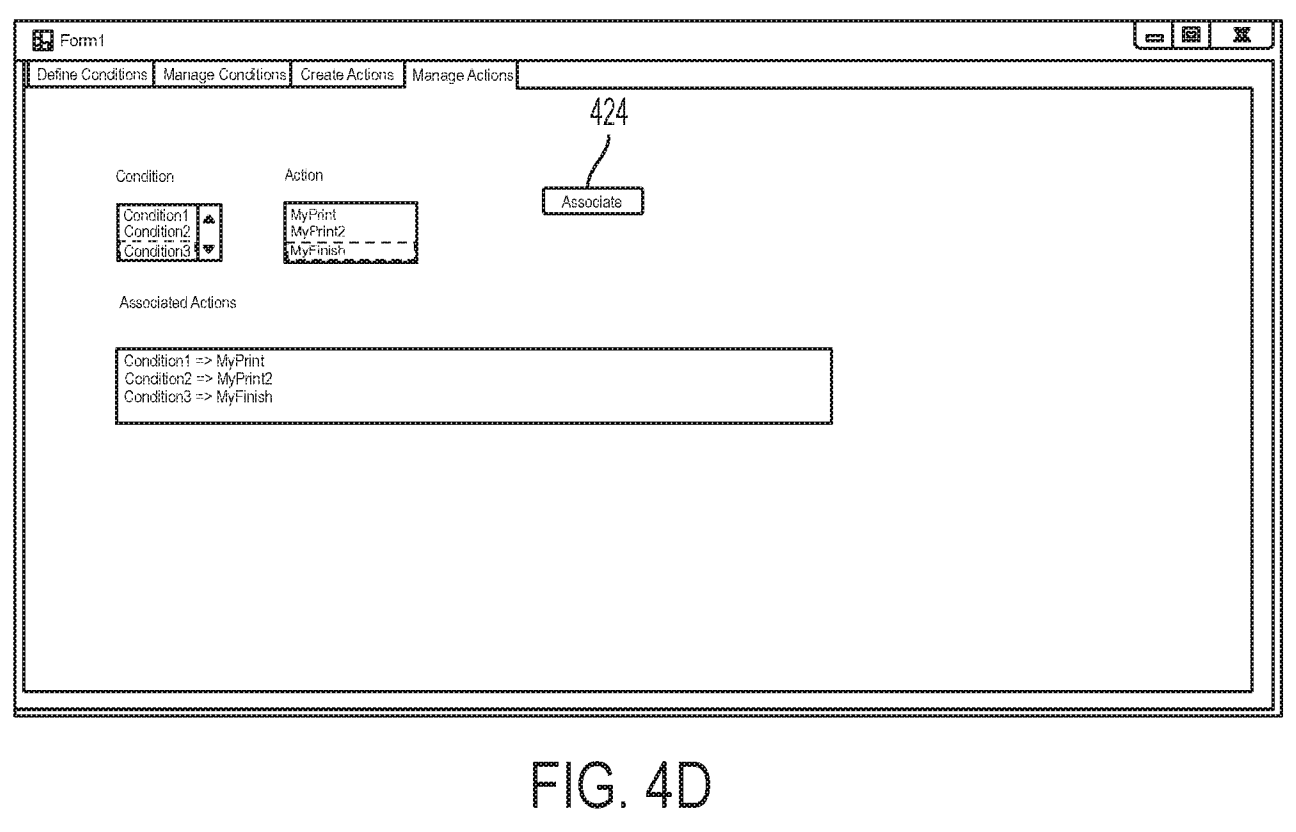

Yet further, with reference to FIG. 4D, the GUI 110 finally allows the user to associate 424 actions or action items with condition of satisfaction. The GUI 110 along with the processor 112 associates each selected conditional limitation of the metadata key-value pairs to the corresponding selected condition of satisfaction. In this way, a particular action/process is assigned to the print job for rendering an output of the PDF/VT file if the metadata key-value pairs are within the bounds of the condition of satisfaction. The selected particular action/process is omitted in the rendering process if the condition of satisfaction is not met.

The condition of satisfaction may set forth particular thresholds, ranges, or bounds for which the variable content (e.g., values) associated with a select metadata key/attribute should meet for a print job to undergo the select print condition as a print action/process during the rendering processes.

Referring back to FIG. 2, once the condition of satisfaction check is performed by the processor 112, the processor 112 activates a job writer 204 to generate or create a newly built or modified print job (hereinafter referred to as "modified print job"). The modified print job is written once the metadata key-value pairs and the condition of satisfaction/print action are tied or associated together. Further, the modified print job, and the rules regarding production information, is provided with the PDF/VT file to a decomposer 206 for generating a printout 120 of the production information present in the PDF/VT file. In this way, one aspect of the present printing system 104 is that the rules regarding rendering of the production data can be edited and/or inserted within the modified print job at the time of printing rather than at the time the PDF/VT file is being created. In other words, the rules encoded in the modified print job do not need to be generated at the time the variable content of the production data is being merged into the PDF/VT file, but rather can be created at the time an electronic display or printout of the PDF/VT file is being produced. The disclosure allows job rules to be specified at the GUI 110 for the printer 118 so that print jobs without embedded rules can have locally specified rules applied to them.

The processor 112 transfers the modified print job along with modified PDF/VT file to the printer 118. At the printer 118, the PDF/VT file and the print job are received by the decomposer 206. The decomposer 206 includes a raster image processor (RIP) that uses the commands and data included in the modified print job to generate the raster data which eventually gets printed. The decomposer 206 receives a fully qualified print job with all the commands and data needed for the printing system 104. The decomposer 206 rasterizes the production information and determines the processes for which the system follows, such as medium finishing commands, for producing a printout (or electronic display). As mentioned, the decomposer 206 decomposes the PDF/VT descriptions for producing a corresponding bitmapped image file, which is then used by a print engine 208 for rendering a printout 120.

Thus, with the implementation of the present subject matter, the processor 112 of the printing system 104 performs proper action/process by accessing an external database or excel file to modify the existing values, or incorporate additional information to the production information, contained in the PDF/VT file.

In case DPart information is to be modified, the processor 112 fetches the key-value pairs from the external database, or excel database, to update the DPart metadata (DPM). Thereafter, based on the modifications to the DPM, the processor 112 activates the job writer to modify the PDF/VT file to modify the print job. Once the PDF/VT file is updated, the updated PDF/VT file is sent to the decomposer 206 for processing and final printout 120 is generated by the print engine 208. This final printout 120 contains information which is added after submitting the job at the printing system 104.

In another case where an additional information or image is to be added to the production information, the processor 112, based on metadata key-value pairs, determines the location of the external database or excel where the additional information or image is stored. Once the location is determined, the processor 112 updates the metadata in the PDF/VT file with an information about location from where the additional information or image/bar code is to be fetched for incorporation into the metadata. Then, the processor 112 fetches the additional information and image/bar code, and stores these with the already existing production information in the PDF/VT file to update the PDF/VT file. Once the PDF/VT file is updated, the updated PDF/VT file is sent to the decomposer 206 for processing and the final printout 120 is generated by the print engine 208. This final printout 120 contains information which is added after submitting the job at the printing system 104.

Figure 5:
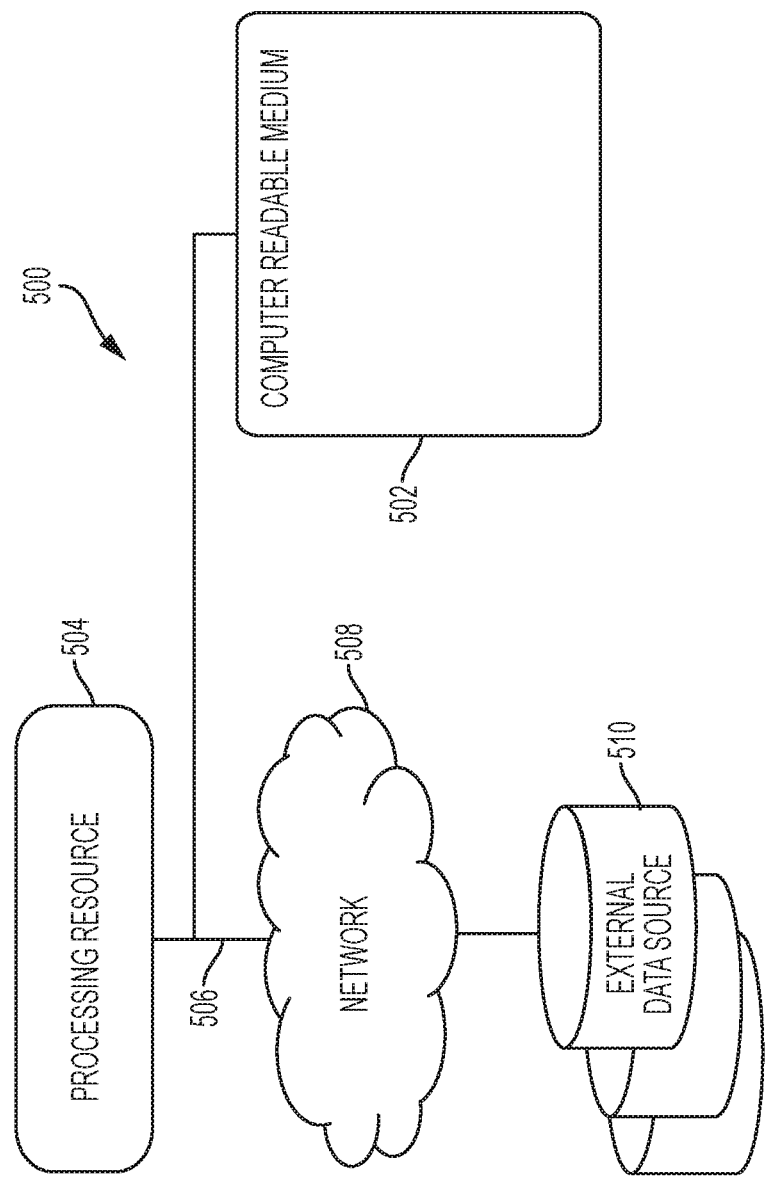
FIG. 5 illustrates a network environment for operating the controller unit, according to an implementation.

FIG. 5 illustrates an example computing environment 500 using a non-transitory computer readable medium 502 for stalling operation of the printing system 104 or the print server 108, according to an example implementation of the present subject matter. The computing environment 500 may be a public computing environment or a private computing environment. In one example, the computing environment 500 includes a processing resource 504 communicatively coupled to the non-transitory computer readable medium 502 through a communication link 506.

For example, the processing resource 504 can be a processor, such as a control device of the printing system 104 or the print server 108. The non-transitory computer readable medium 502 can be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 can access the non-transitory computer readable medium 502 through a network 508. The network 508 may be a single network or a combination of multiple networks and may use a variety of communication protocols.

The processing resource 504 and the non-transitory computer readable medium 502 may also be communicatively coupled to external data sources 510 over the network 508. The external data sources 510 can include, for example, databases and computing devices. The external data sources 510 may be used by the database administrators and other users to communicate with the processing resource 504.

In one example, the non-transitory computer readable medium 502 can include a set of computer readable instructions. The set of computer readable instructions, referred to as instructions hereinafter, can be accessed by the processing resource 504 through the communication link 506 and subsequently executed to perform acts for network service insertion. In other words, during operation, the processing resource 504 can execute the computer readable instructions.

On execution by the processing resource 504, the graphic user interface (GUI) 110 of the digital printer 118 receives a request from a user to extract the metadata of a print job from a PDF/VT file present at the digital printer 118. Upon receiving the request, a number of print conditions of the graphic user interface, where the print conditions are for facilitating the user to modify the production information available in the PDF/VT file. After the displaying and in response to receiving directional inputs from the user, the metadata for production information available in the PDF/VT file are extracted. The metadata includes key-value pairs of production information available within the PDF/VT file. Based on the extracted key-value pairs, an external database is queried and the production information is modified to generate a modified PDF/VT file. Based on the modified PDF/VT file, a modified print job is generated. The modified print job is decomposed for producing a digital bitmap image based on the modified PDF/VT file, and the digital bitmap image is used to render an output image. Finally, the output image is printed at the digital printer 118.

Thus, with the implementation of the present subject matter, the print job can receive additional information in the PDF/VT file on the run, and that too without adding or creating a new PDF/VT file. Such implementation reduces the additional effort of recreating the entire print job. Hence, the present subject matter facilitates the users to extract the production information from the PDF/VT file, to use that production data as a base to consume additional information from external resources, such as external databases, and to print the modified production data of the PDF/VT file as output having additional information.

Figure 6:
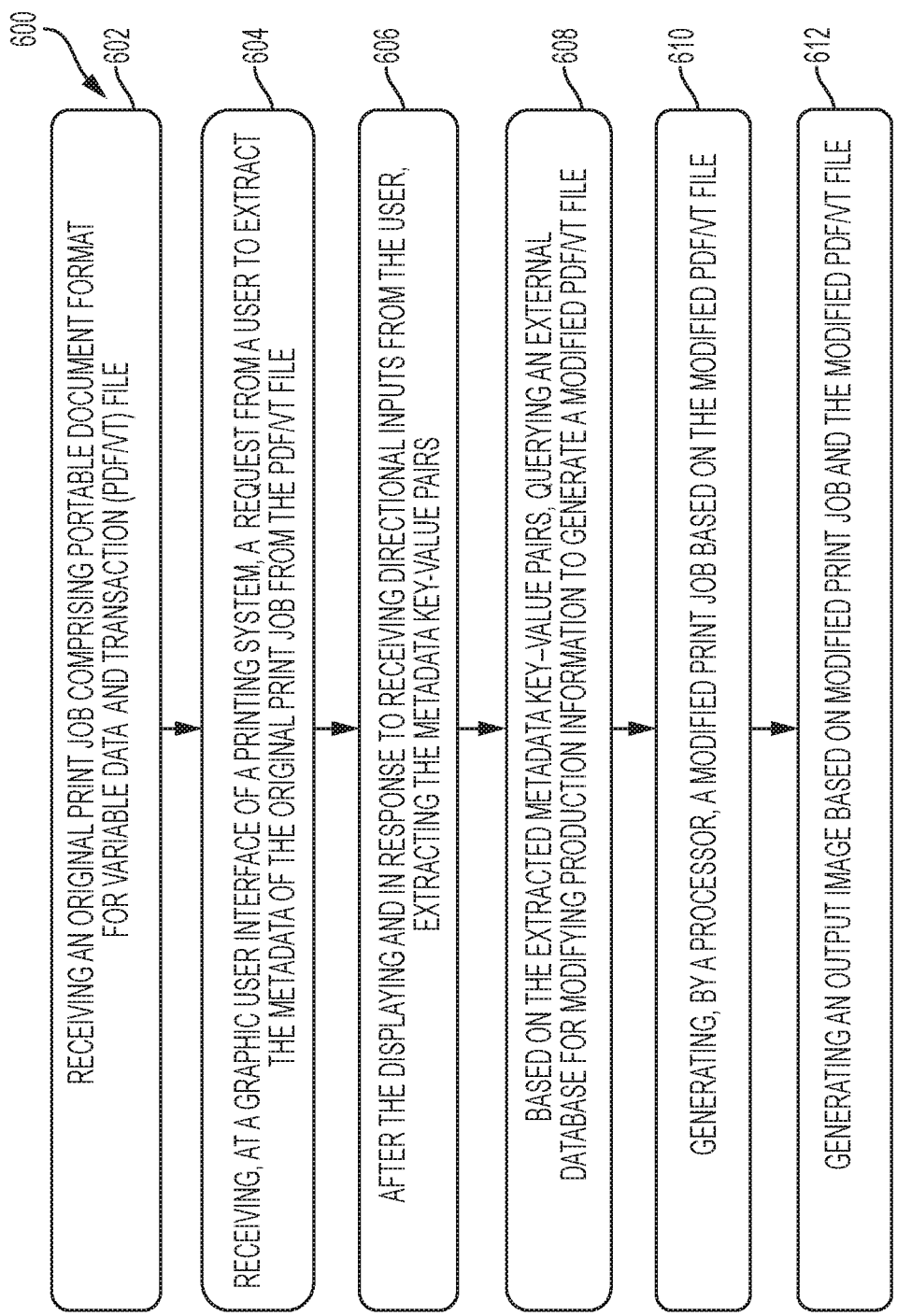
FIG. 6 illustrates a method for operating the controller unit, according to an implementation.

Method 600 is described in FIG. 6 for operating a multifunctional device (MFD) such as the printing system 104, according to an example of the present subject matter. The order in which the method 600 is described is not intended to be construed as a limitation, and any number of the described method blocks can be combined in any appropriate order to carry out the method 600 or an alternative method. Additionally, individual blocks may be deleted from the method 600 without departing from the scope of the subject matter described herein.

The method 600 can be performed by programmed computing devices, for example, based on instructions retrieved from the non-transitory computer readable medium or non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIG. 6, the method 600 may be performed by a processing device, such as a processor 112 of the MFD such as the printing system 104.

At block 602, the printing system 104 receives an original print job from a user device 102. The original print job is received in the form of page description language (PDL) file such as Portable Document Format for Variable data and Transaction (PDF/VT) file. The PDL file may include production information about various objects, say, characters, words, text, graphics, photos, line, and the like, contained in the PDL file. The production information may also describe the appearance of the objects present within the PDL file, and may include a set of programming language commands for processing the PDL file based on the production information. In one example, the PDL file or the PDF/VT file may include metadata for the production information available in the PDL file or the PDF/VT file.

At block 604, the printing system 104 receives, at its graphic user interface (GUI) 110, a request from the user to extract the metadata of the original print job from the PDF/VT file. Upon receiving the request, the GUI 110 displays a number of print conditions for the metadata. In an example, the print conditions are options for modifying the production information available in the PDF/VT file of the original print job. In said example, the print conditions may include modify Document Part (DPart) information, embed additional information, and add images. The images can be, for example, barcodes.

At block 606, after the displaying and in response to receiving directional inputs from the user, the parser 202 coupled to the GUI 110 extracts the metadata for the production information available in the PDF/VT file. In an example, the metadata includes key-value pairs of the production information available within the PDF/VT file.

At block 608, based on the extracted key-value pairs, the processor 112, coupled to the GUI 110, includes a parser 202 for querying an external database based on the extracted key-value pairs in order to modify the production information to generate a modified PDF/VT file.

At block 610, the job writer 204 comprised in the processor 112 generates a modified print job based on the modified PDF/VT file.

At block 612, the decomposer 206, coupled to the processor 112, decomposes the modified print job for producing a digital bitmap image based on the modified PDF/VT file. The digital bitmap image is then forwarded to a print engine 208 coupled to the decomposer 206 and the processor 112. The print engine 208 renders an output image using the digital bitmap image, and prints the output image at a digital printer 118 of the printing system 104.

Thus, with the implementation of the present subject, the method 600 described herein can easily performs proper action/process by accessing an external database or excel file to modify the existing values, or incorporate additional information to the production information, contained in the PDF/VT file.

In one example implementation, at block 606, after the displaying and in response to receiving directional inputs from the user as "modify Document DPart information." The processor 112 performs extraction of DPart Metadata (DPM) of the DPart available within the PDF/VT file to the user. In an example, the DPM includes key-value pairs of the DPart available within the PDF/VT file. Based on the extracted key-value pairs of the DPM, the processor 112 queries an external database to modify the DPart. Thereafter, the processor 112 generates a modified PDF/VT file based on the modified DPart. Such modified PDF/VT file is then used by the digital printer 118 of the printing system 104 to generate an output image.

In another example implementation, at block 606, after the displaying and in response to receiving directional inputs from the user as "embed additional information." The processor 112 performs extraction of metadata of the production information available in the PDF/VT file. In an example, the metadata includes key-value pairs of the production information available within the PDF/VT file. Based on the extracted key-value pairs, the processor 112 queries an external database for embedding additional information, such as gender of an individual, address of that individual, pin code of that address, and the like, to the production information available in the PDF/VT file, defines the location address of the additional information in the metadata of the production information available in the PDF/VT file, and saves the additional information within the production information to generate a modified PDF/VT file for generating a modified print job. Such modified PDF/VT file is then used by the digital printer 118 of the printing system 104 to generate an output image.

In yet another example implementation, at block 606, after the displaying and in response to receiving directional inputs from the user as "add images." The processor 112 performs extraction of metadata of the production information available in the PDF/VT file. In an example, the metadata includes key-value pairs of the production information available within the PDF/VT file. Based on the extracted key-value pairs, the processor 112 queries an external database for adding images to the production information available in the PDF/VT file, defines the location address of the images in the metadata of the production information available in the PDF/VT file, adds the images to the production information available in the PDF/VT file, and saves the images within the production information to generate a modified PDF/VT file for generating a modified print job. Such modified PDF/VT file is then used by the digital printer 118 of the printing system 104 to generate an output image.

Thus, with the implementation of the present subject matter, the print job can receive additional information in the PDF/VT file on the run, and that too without adding or creating a new PDF/VT file. Such implementation reduces the additional effort of recreating the entire print job. Hence, the present subject matter facilitates the users to extract the production information from the PDF/VT file, to use that production data as a base to consume additional information from external resources, such as external databases, and to print the modified production data of the PDF/VT file as output having additional information.

For a person skilled in the art it is understood that the printing system should not be mixed with the phrase printer. The printing system refers to an application that performs the function of facilitating a user of a user device (or client device) to modify production information or to embed addition information into the production information, as discussed above in detail, after the print job request is sent to a printer. The printing system may be a part of the printer while the printing system may be separately located or remotely located from the printer.

Further, the present subject matter is disclosed herein with reference to a server-client architecture; however, the subject matter is equally applicable to printing systems implemented in multi-functional devices, such as printers, copiers, and the like, which are in direct communication with the user devices.

For a person skilled in the art, it is understood that the use of phrase(s) "is," "are," "may," "canv "could," "will," "should," or the like, is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving," or "displaying," or "extracting," or "querying," or "generating," or "decomposing," or "rendering," or "printing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for enabling use metadata to control printing outcomes, the method comprising:
   receiving, at a printing system, an original print job comprising a Portable Document Format for Variable data and Transaction (PDF/VT) file, wherein the PDF/VT file comprising metadata for production information is available in the PDF/VT file;
   receiving, at a graphic user interface of the printing system, a request from a user to extract the metadata of the original print job from the PDF/VT file;
   upon receiving the request, displaying a number of print conditions for the metadata at the graphic user interface, wherein the print conditions comprise modified Document Part (DPart) information, and wherein the print conditions are options for modifying Document Part (DPart) information available in the PDF/VT file of the original print job;
   after the displaying and in response to receiving directional inputs from the user, extracting the metadata for production information available in the PDF/VT file, wherein the metadata includes key-value pairs of the production information available within the PDF/VT file;
   after the extracting, displaying one or more options at the graphic user interface for building conditional logic for print actions based on the extracted key-value pairs, wherein the conditional logic comprises one or more conditions of satisfaction for the extracted key-value pairs;
   performing a condition of satisfaction check based on the one or more conditions of satisfaction for the extracted key-value pairs;
   after performing the condition of satisfaction check, querying an external database for modifying the production information to generate a modified PDF/VT file, wherein the external database is located based on the extracted key-value pairs;

generating, by a processor, a modified print job based on the modified PDF/VT file, wherein the modified print job is generated once the extracted key-value pairs and the one or more conditions of satisfaction are tied together;

decomposing the modified print job for producing a digital bitmap image based on the modified PDF/VT file;

rendering, by a print engine, an output image using the digital bitmap image; and printing the output image at the printing system.

2. The method as claimed in claim 1, wherein the print conditions further comprise one or both of embedding additional information and adding images.

3. The method as claimed in claim 1, wherein when the user selects to modify the Document DPart information, the method comprising:

extracting DPart Metadata (DPM) of the DPart available within the PDF/VT file to the user, wherein the DPM includes key-value pairs of the DPart available within the PDF/VT file;

based on the extracted key-value pairs of the DPM, querying the external database to modify the DPart; and generating the modified PDF/VT file based on the modified DPart.

4. The method as claimed in claim 2, wherein when the user selects to embed the additional information, the method comprising:

querying the external database for embedding the additional information to the production information available in the PDF/VT file;

defining location address of the additional information in the metadata of the production information available in the PDF/VT file; and saving the additional information within the production information to generate the modified PDF/VT file for generating the modified print job.

5. The method as claimed in claim 2, when the user selects to add the images, the method comprising:

querying the external database for adding the images to the production information available in the PDF/VT file;

defining location address of the images in the metadata of the production information available in the PDF/VT file;

adding the images to the production information available in the PDF/VT file; and saving the images within the production information to generate the modified PDF/VT file for generating the modified print job.

6. The method as claimed in claim 5, wherein the images include barcodes.

7. A printing system for enabling use of metadata to control printing outcomes, the printing system comprising:

a graphic user interface to:

receive a request from a user to extract metadata of an original print job from a Portable Document Format for Variable data and Transaction (PDF/VT) file, and upon receiving the request, display a number of print conditions for the metadata at the graphic user interface, wherein the print conditions comprise modified Document Part (DPart) information, and wherein the print conditions are options for modifying Document Part (DPart) information available in the PDF/VT file of the original print job;

a processor, coupled to the graphic user interface, comprising a parser to:

extract the metadata for production information available in the PDF/VT file after the displaying and in response to receiving directional inputs from the user, wherein the metadata includes key-value pairs of the production information available within the PDF/VT file;

after the extraction, control display of one or more options at the graphic user interface for building conditional logic for print actions based on the extracted key-value pairs, wherein the conditional logic comprises one or more conditions of satisfaction for the extracted key-value pairs;

perform a condition of satisfaction check based on the one or more conditions of satisfaction for the extracted key-value pairs;

after performing the condition of satisfaction check, query an external database for modifying the production information to generate a modified PDF/VT file, wherein the external database is located based on the extracted key-value pairs; and generate a modified print job based on the modified PDF/VT file, wherein the modified print job is generated once the extracted key-value pairs and the one or more conditions of satisfaction are tied together;

a decomposer, coupled to the processor, to decompose the modified print job for producing a digital bitmap image based on the modified PDF/VT file; and a print engine, coupled to the decomposer and the processor, to render an output image using the digital bitmap image, and print the output image at the printing system.

8. The printing system as claimed in claim 7, wherein the print conditions further comprise one or both of embedding additional information and adding images.

9. The printing system as claimed in claim 8, wherein when the user selects to modify the Document DPart information, the processor is to:

extract DPart Metadata (DPM) of the DPart available within the PDF/VT file to the user, wherein the DPM includes key-value pairs of the DPart available within the PDF/VT file;

based on the extracted key-value pairs of the DPM, query the external database to modify the DPart; and generate the modified PDF/VT file based on the modified DPart.

10. The printing system as claimed in claim 7, wherein when the user selects to embed the additional information, the processor is to:

query the external database for embedding the additional information to the production information available in the PDF/VT file;

define location address of the additional information in the metadata of the production information available in the PDF/VT file; and save the additional information within the production information to generate the modified PDF/VT file for generating the modified print job.

11. The printing system as claimed in claim 7, when the user selects to add the images, the processor is to:

query the external database for adding the images to the production information available in the PDF/VT file;

define location address of the images in the metadata of the production information available in the PDF/VT file;

add the images to the production information available in the PDF/VT file; and save the images within the production information to generate the modified PDF/VT file for generating the modified print job.

12. The printing system as claimed in claim 11, wherein the images include barcodes.

13. The printing system as claimed in claim 7, wherein the graphical user interface provides, to the user, an interface on a digital front end (DFE).

14. The printing system as claimed in claim 13, wherein the interface on the DFE facilitates a PDF/VT definer application for modifying or editing content of the PDF/VT file.

15. A non-transitory computer-readable medium comprising instructions executable by a processing resource to:

receive a request from a user to extract metadata of an original print job from a Portable Document Format for Variable data and Transaction (PDF/VT) file;

upon receiving the request, display a number of print conditions for the metadata at a graphic user interface, wherein the print conditions comprise modified Document Part (DPart) information, and wherein the print conditions are options for modifying Document Part (DPart) information available in the PDF/VT file of the original print job;

extract the metadata for production information available in the PDF/VT file after the displaying and in response to receiving directional inputs from the user, wherein the metadata includes key-value pairs of the production information available within the PDF/VT file;

after the extraction, control display of one or more options at the graphic user interface for building conditional logic for print actions based on the extracted key-value pairs, wherein the conditional logic comprises one or more conditions of satisfaction for the extracted key-value pairs;

perform a condition of satisfaction check based on the one or more conditions of satisfaction for the extracted key-value pairs;

after performing the condition of satisfaction check, query an external database for modifying the production information to generate a modified PDF/VT file, wherein the external database is located based on the extracted key-value pairs;

generate a modified print job based on the modified PDF/VT file, wherein the modified print job is generated once the extracted key-value pairs and the one or more conditions of satisfaction are tied together;

decompose the modified print job for producing a digital bitmap image based on the modified PDF/VT file;

render an output image using the digital bitmap image; and print the output image at a printing system.

16. The non-transitory computer-readable medium as claimed in claim 15, wherein the print conditions further comprise one or both of embedding additional information and adding images.

17. The non-transitory computer-readable medium as claimed in claim 15 comprising instructions executable by the processing resource to:

extract DPart Metadata (DPM) of the DPart available within the PDF/VT file to the user, wherein the DPM includes key-value pairs of the DPart available within the PDF/VT file;

based on the extracted key-value pairs of the DPM, query the external database to modify the DPart; and generate the modified PDF/VT file based on the modified DPart.

18. The non-transitory computer-readable medium as claimed in claim 16 comprising instructions executable by the processing resource to:

query the external database for embedding the additional information to the production information available in the PDF/VT file;

define location address of the additional information in the metadata of the production information available in the PDF/VT file; and save the additional information within the production information to generate the modified PDF/VT file for generating the modified print job.

19. The non-transitory computer-readable medium as claimed in claim 16 comprising instructions executable by the processing resource to:

query the external database for adding the images to the production information available in the PDF/VT file;

define location address of the images in the metadata of the production information available in the PDF/VT file;

add the images to the production information available in the PDF/VT file; and save the images within the production information to generate the modified PDF/VT file for generating the modified print job.

20. The non-transitory computer-readable medium as claimed in claim 19, wherein the images include barcodes.

* * * * *